United States Patent
Yoo et al.

(10) Patent No.: US 11,678,089 B2
(45) Date of Patent: Jun. 13, 2023

(54) METHOD AND SYSTEM FOR COLLECTING SENSOR DATA USING DATA CHANNEL AND CONTROL CHANNEL

(71) Applicant: Nkia Co., Ltd., Seongnam-si (KR)

(72) Inventors: Sung Soo Yoo, Anyang-si (KR); In Hwan Lee, Seongnam-si (KR); Ki Hoon Shin, Anyang-si (KR); Jae Hun Shim, Osan-si (KR); Jung Hwan Son, Seoul (KR)

(73) Assignee: NKIA CO., LTD., Seongnam-si (KR)

( * ) Notice: Subject to any disclaimer, the term of this patent is extended or adjusted under 35 U.S.C. 154(b) by 0 days.

(21) Appl. No.: 17/376,520

(22) Filed: Jul. 15, 2021

(65) Prior Publication Data

US 2022/0174376 A1 Jun. 2, 2022

(30) Foreign Application Priority Data

Nov. 30, 2020 (KR) .................. 10-2020-0163899

(51) Int. Cl.
*H04Q 9/00* (2006.01)
*H04W 88/16* (2009.01)

(52) U.S. Cl.
CPC ............ *H04Q 9/00* (2013.01); *H04Q 2209/40* (2013.01); *H04W 88/16* (2013.01)

(58) Field of Classification Search
CPC .. H04Q 9/00; H04Q 2209/00; H04Q 2209/10; H04Q 2209/40; H04Q 2209/70; H04Q 2209/80; H04Q 2209/82; H04Q 2209/84; H04W 88/16
See application file for complete search history.

(56) References Cited

U.S. PATENT DOCUMENTS

| | | | | |
|---|---|---|---|---|
| 8,438,249 | B2 * | 5/2013 | Urano | G06F 1/14 709/224 |
| 8,648,734 | B2 * | 2/2014 | Harnett | H04Q 9/00 340/870.01 |
| 10,237,812 | B2 * | 3/2019 | Ahmad | H04W 48/16 |
| 10,284,926 | B2 * | 5/2019 | Bambrick | H04Q 9/00 |

(Continued)

FOREIGN PATENT DOCUMENTS

| | | |
|---|---|---|
| KR | 100779105 | 11/2007 |
| KR | 20090023240 | 3/2009 |

(Continued)

OTHER PUBLICATIONS

European Office Action—European Application No. 21185824.6 dated Jan. 4, 2022, citing US 2020/175852, US 2018/302290, and US 2008/136708.

*Primary Examiner* — Franklin D Balseca
(74) *Attorney, Agent, or Firm* — Cantor Colburn LLP (57) ABSTRACT

Provided is a method and system for collecting sensor data using a data channel and a control channel. The method and system construct an appropriate and efficient communication environment when there are several sensors corresponding to one gateway in order to collect measured data from the sensors, by using a separate control channel for general control communication and a data channel for data communication to transmit data after confirming whether the data channel is available through the control channel in the communication between a gateway and sensors.

9 Claims, 5 Drawing Sheets

(56) References Cited

U.S. PATENT DOCUMENTS

| | | | | |
|---|---|---|---|---|
| 2004/0032876 A1* | 2/2004 | Garg | ................ | H04L 47/808 |
| | | | | 370/352 |
| 2008/0136708 A1* | 6/2008 | Kim | ................ | H04W 52/16 |
| | | | | 342/367 |
| 2018/0302290 A1 | 10/2018 | Rahman et al. | | |
| 2020/0175852 A1 | 6/2020 | Yamashita et al. | | |
| 2021/0285915 A1* | 9/2021 | Chen | ................ | E21B 47/006 |

FOREIGN PATENT DOCUMENTS

| KR | 20110056262 | 5/2011 |
|---|---|---|
| KR | 20120068291 | 6/2012 |
| KR | 101329306 | 11/2013 |
| KR | 101679519 | 11/2016 |

\* cited by examiner

METHOD AND SYSTEM FOR COLLECTING SENSOR DATA USING DATA CHANNEL AND CONTROL CHANNEL

BACKGROUND OF THE INVENTION

Field of the Invention

The present invention relates to a method and system for collecting sensor data using a data channel and a control channel, and more particularly, to a method and system for collecting data collected by a sensor by performing communication using separate channels for control communication and data communication to collect data from multiple sensors with one gateway.

Background of the Related Art

A gateway means a computer or software that enables communication between networks using different communication networks in a computer network, which is a network point functioning as an entrance to another network.

The gateway collects and analyzes sensor data and transfers valid data to a server or the like, and in collecting the sensor data from multiple sensors with one gateway in the process of collecting the sensor data, it is required to provide an effective and stable communication method from the aspect of communication environment and time.

SUMMARY OF THE INVENTION

Accordingly, the present invention has been made to solve the problems described above, and it is an object of the present invention to enable stable and efficient data communication and construct an appropriate communication environment in accordance with a customer's environment by using separate channels for control communication and data communication between a gateway and a sensor when the gateway collects sensor data.

The objects of the present invention are not limited to those mentioned above, and unmentioned other objects will be clearly understood by those skilled in the art from the following description.

To accomplish the above object, there is provided a sensor data collection method comprising the steps of: (A) starting measurement and notifying start of measurement to a gateway by a sensor unit, and transmitting a measurement start event to a server by the gateway that has received the measurement start notification; (B) requesting data collection from the gateway through a control channel by the sensor unit when the measurement is finished, and transmitting a collection request event to the server and determining whether a data channel is available by the gateway that has received the data collection request; (C) transmitting a collection permission response to the sensor unit and transmitting a collection permission event to the server by the gateway when the data channel is available; (D) performing data communication with the gateway to transmit measured data through the data channel by the sensor unit when the collection permission response is received; and (E) notifying termination of collection to the gateway by the sensor unit when transmission of the measured data is finished, and transmitting a collection termination event to the server and transmitting the received sensor data by the gateway that has received the termination of collection.

Steps (A) to (E) are performed at set intervals.

The sensor unit enters a standby mode of standing by without measuring data after step (E), and performs steps (A) to (E) when a new motion is detected.

At step (C), the gateway transmits the collection permission response to the sensor unit and transmits the collection permission event to the server when the data channel is available, and the gateway requests the sensor unit to wait for a predetermined time when the data channel is unavailable, and performs step (B) after the predetermined time is elapsed.

The sensor unit includes a sensor node for measuring leakage magnetic flux of an object that needs to be measured.

According to another embodiment of the present invention, there is provided a sensor data collection system comprising: a sensor unit including one or more sensor nodes directly or indirectly connected to each other; a gateway for collecting sensor data measured by the sensor unit; one or more data channels for transmitting the sensor data measured by the sensor unit to a gateway; a control channel through which the gateway confirms whether any one of the data channels is available; and a server for storing and analyzing the data transmitted from the gateway in a database classified by sensor.

The sensor unit enters a standby mode of standing by without measuring data until a new motion is detected when data collection of transmitting the data measured by the sensor node to the gateway is finished, and begins measurement again when a motion is detected.

The data channel transmits the sensor data measured by the sensor unit to the gateway when the sensor unit inquires the gateway whether a data channel is available through the control channel and receives an answer indicating that the data channel is available.

The one or more sensor nodes include a sensor for measuring leakage magnetic flux of an object that needs to be measured.

DESCRIPTION OF SYMBOLS

10: Sensor node
100: Sensor unit
200: Gateway
300: Data channel
400: Control channel
500: Server

DETAILED DESCRIPTION OF THE PREFERRED EMBODIMENT

The above objects, other objects, features and advantages of the present invention will be easily understood through the following preferred embodiments related to the accompanying drawings. However, the present invention is not limited to the embodiments described herein and may be embodied in other forms. Rather, the embodiments introduced herein are provided so that the disclosed contents may be thorough and complete and the spirit of the present invention may be sufficiently conveyed to those skilled in the art.

In this specification, when the terms such as first, second, and the like are used to describe components, these components should not be limited by these terms. These terms are only used to distinguish one component from another. The embodiments described and illustrated herein also include complementary embodiments thereof.

In addition, when it is stated that a certain element, component, device or system includes a component configured of a program or software, although not explicitly stated, it should be understood that the element, component, device or system includes hardware (e.g., memory, CPU, etc.) or other programs or software (e.g., an operating system, drivers needed for operating the hardware, etc.) needed for the program or software to execute or operate.

In addition, the terms used in this specification are for describing the embodiments and are not intended to limit the present invention. In this specification, singular forms also include plural forms unless specially stated otherwise in the phrase. The terms 'comprises' and/or 'comprising' used in this specification means that a stated component does not exclude presence or addition of one or more other components.

In addition, the terms such as ' . . . unit', ' . . . group' 'module' and the like mean a unit that processes at least one function or operation, and they may be implemented as hardware, software, or a combination of hardware and software. In addition, the articles such as 'a', 'an', and 'the' in the context of describing the present invention may be used as a meaning that includes both the singular and plural forms unless otherwise indicated herein or clearly contradicted by the context in the context of describing the present invention.

In describing specific embodiments below, various specific contents have been prepared to more specifically describe the invention and help understanding. However, a reader having enough knowledge in this field to understand the present invention may recognize that it can be used without these various specific details.

It is mentioned in advance that in describing the invention, those parts that are commonly known and not greatly related to the present invention will not be described in some cases to avoid confusion without any particular reason in explaining the invention.

Hereinafter, specific technical contents to be embodied in the present invention will be described in detail with reference to the accompanying drawings.

Figure 1:
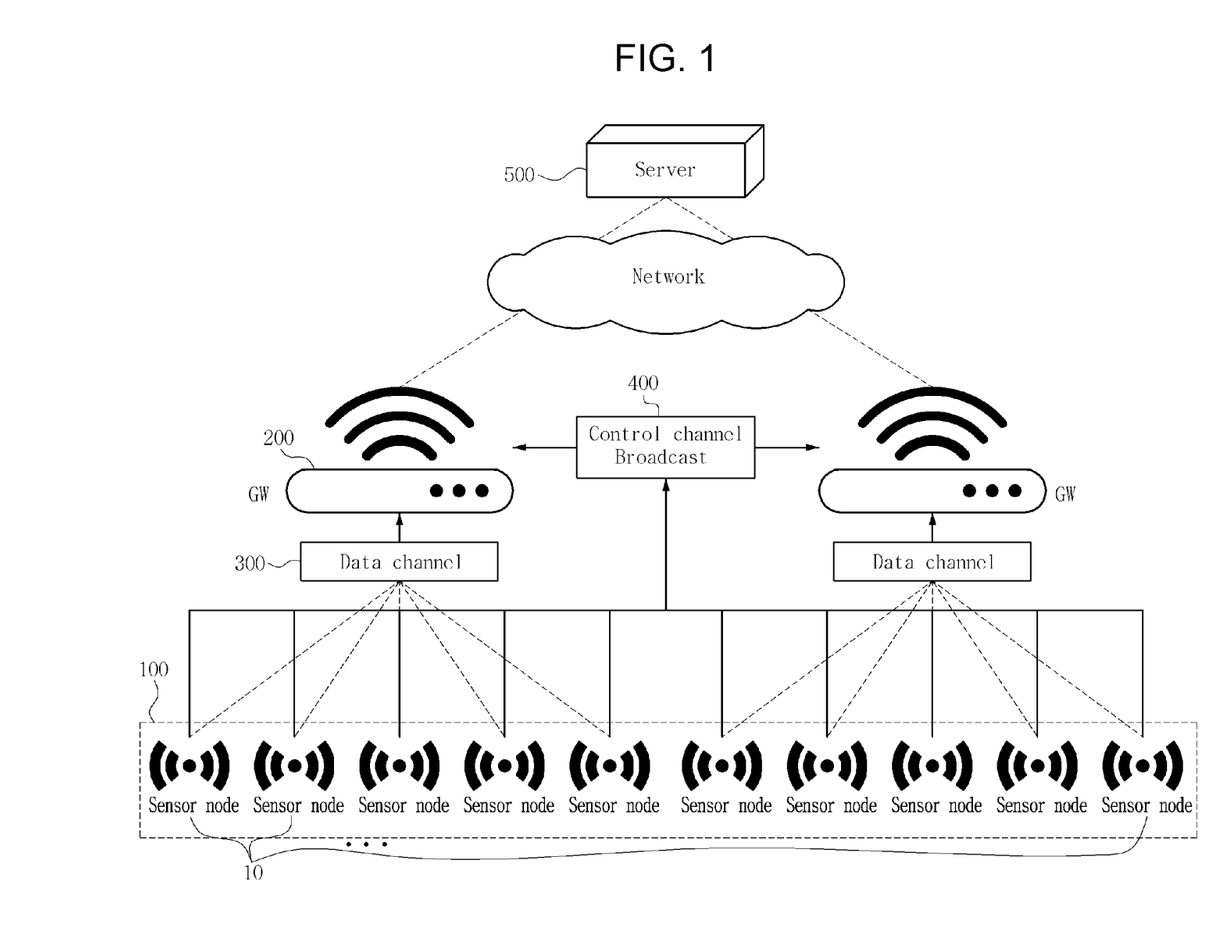
FIG. 1 is a view showing the configuration of a sensor data collection system according to an embodiment of the present invention.

FIG. 1 is a view showing the configuration of a sensor data collection system according to an embodiment of the present invention.

Referring to FIG. 1, a sensor data collection system according to an embodiment of the present invention includes a sensor unit 10, gateways 200, data channels 300, a control channel 400, and a server 500.

Here, the sensor unit 100 includes one or more sensor nodes 10, and the one or more sensor nodes 10 are directly or indirectly connected to each other.

In addition, when the data collection process of transmitting data measured by the sensor node 10 to the gateway is finished, the sensor unit 100 enters a standby mode of standing by without measuring data until a new motion is detected, and when a new motion is detected thereafter, it begins measurement again.

As described, the sensor unit 100 may operate with low power by utilizing a state that does not measure data, i.e., the standby mode.

At this point, in the standby mode, the sensor unit 100 activates a motion detection sensor such as a gyro sensor or the like to detect a new motion.

In addition, the gateway 200 collects sensor data measured by the sensor unit 100.

Here, in collecting the sensor data, the gateway 200 utilizes a data channel 300 and the control channel 400 to guarantee stable data communication.

The data channel 300 is used for data communication for transmitting the sensor data measured by the sensor unit 100 to the gateway 200, and one or more data channels 300 are included.

Here, in order for the data channel 300 to be used for transmission of the sensor data, the sensor unit 100 needs to confirm whether the data channel 300 is available from the gateway 200 through the control channel 400.

The control channel 400 is to confirm by the gateway 200 whether one of the data channels 300 is available. That is, the control channel 400 is a communication channel for querying the gateway 200 whether one of the data channels 300 is available and receiving a response.

As described, the data channel 300 is used for data communication between the gateway 200 and the sensor unit 100, and the control channel 400 is used for control communication between the gateway 200 and the sensor unit 100.

Since data communication takes a long time and the control communication other than the data communication takes a short time compared thereto, stable and effective data communication is possible by separating the communication channels between the gateway 200 and the sensor unit 100.

Accordingly, the sensor unit 100 inquires the gateway 200 whether the data channel 300 is available through the control channel 400, and the data channel 300 may transmit the sensor data measured by the sensor unit 100 to the gateway 200 when an answer indicating that the data channel 300 is available is received from the gateway 200.

Here, the sensor node 10 may be a sensor that measures leakage magnetic flux of an object that needs to be measured.

Accordingly, when the sensor node 10 is a magnetic flux leakage sensor, it may determine whether an object is damaged by measuring the leakage magnetic flux of the object.

The server 500 may store and analyze the sensor data transmitted to the gateway 200 in a database classified by sensor.

Referring to FIG. 1, the gateway 200 and the server 500 may communicate through a wired/wireless network.

Figure 2:
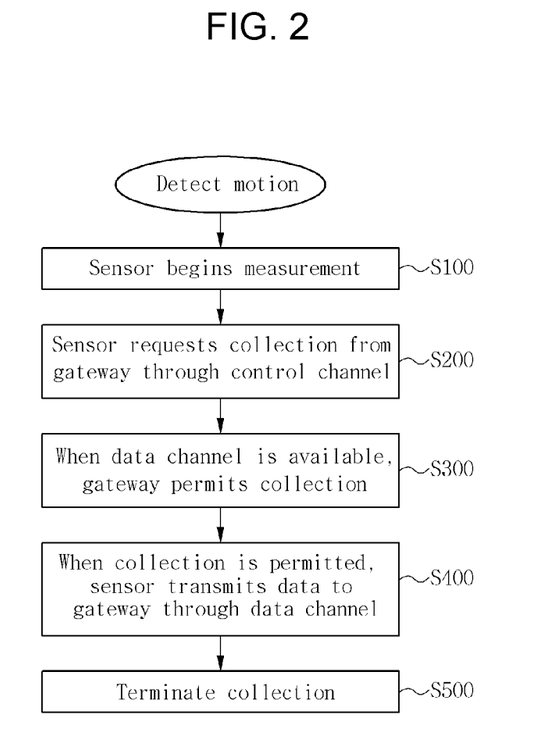
FIG. 2 is a flowchart illustrating the sequence of a sensor data collection method according to an embodiment of the present invention.

FIG. 2 is a flowchart illustrating the sequence of a sensor data collection method according to an embodiment of the present invention.

Referring to FIG. 2, a sensor data collection method according to an embodiment of the present invention includes the steps of (A) starting measurement by the sensor unit (S100), (B) requesting data collection from the gateway through the control channel by the sensor (S200), (C) allowing data collection by the gateway when a data channel is available (S300), (D) transmitting data to the gateway through the data channel by the sensor allowed to collect data (S400), and (E) terminating collection (S500).

Here, at step (A) (S100), the sensor unit 100 starts measurement, notifies start of measurement to the gateway 200 (Noti: motion detection, measurement start), and the gateway 200 receiving the measurement start notification transmits a measurement start event to the server 500.

Here, the sensor unit 100 may include at least one sensor node 10, and the sensor node 10 may be a sensor node that measures leakage magnetic flux of an object that needs to be measured.

Here, the sensor unit 100 may be set to start measurement of data when it detects a new motion in the standby mode of standing by without measuring data, and in this case, since the sensor unit 100 detects a motion before starting measurement, the measurement start informed to the gateway 200 may include motion detection and start of measurement, and the measurement start event that the gateway 200 notifies the server 500 may also include motion detection and a measurement start event.

In addition, at step (B) (S200), when measurement is finished, the sensor unit 100 requests data collection from the gateway 200 through the control channel 400, and the gateway 200 receiving the data collection request transmits a collection request event to the server 500 and determines whether the data channel 300 is available.

The sensor unit 100 requests data collection (REQ: request of collection) when the measurement is finished and may transmit data to the gateway 200 through the data channel 300 when collection is possible.

Accordingly, as described above, in order for the sensor unit 100 to transmit measured data to the gateway 200, it should first request data collection from the gateway 200 through the control channel 400.

At step (C) (S300), when the data channel 300 is available, the gateway 200 transmits a collection permission response to the sensor unit 100, and transmits a collection permission event to the server 500.

As described, the gateway 200 determines whether the data channel 300 that the sensor unit 100 has requested to confirm through the control channel 400 is available, and permits collection when the data channel 300 is available.

Here, the gateway 200 transmits a collection permission response (RES: permission of collection) to the sensor unit 100 and notifies generation of the collection permission event to the server 500.

Figure 3:
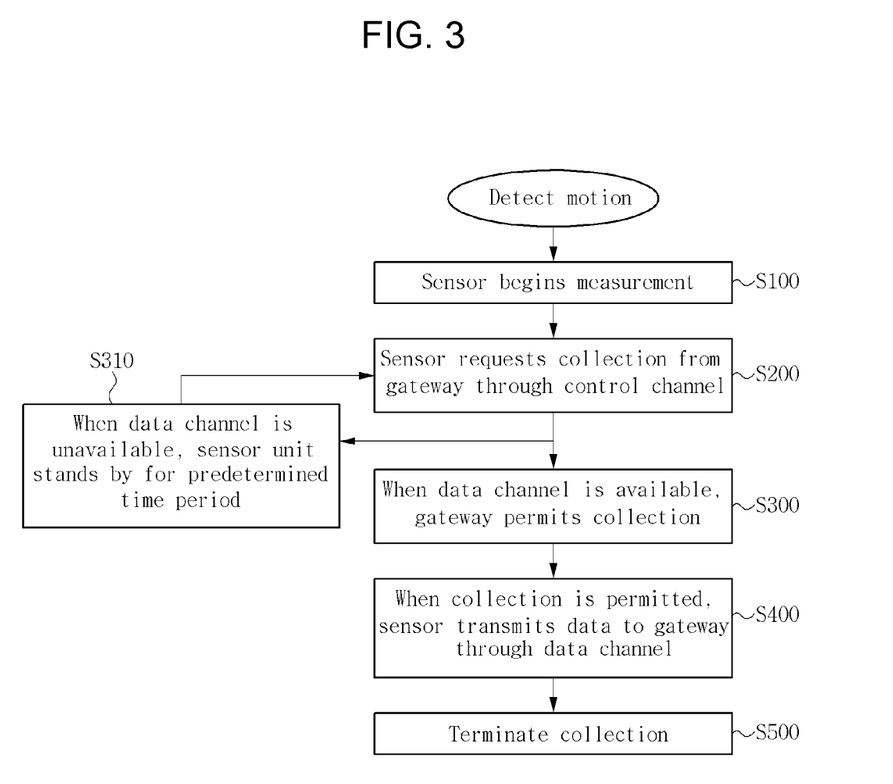
FIG. 3 is a flowchart adding a case incapable of using a data channel to the flowchart of FIG. 2.

FIG. 3 is a flowchart adding a case incapable of using a data channel to the flowchart of FIG. 2.

Referring to FIG. 3, at step (C) (S300), when the data channel 300 is unavailable, the gateway 200 requests the sensor unit 100 to wait for a predetermined time, and the sensor unit 100 that has waited for the predetermined time may sequentially repeat the steps starting from step (B) (S200) (S310).

Accordingly, when the data channel 300 is unavailable although the sensor unit 100 requests data collection from the gateway 200 through the control channel 400, the sensor unit 100 waits for a predetermined time (S310), and requests data collection again from the gateway 200 (S200), and when the data channel 300 is available, the sensor unit 100 is permitted to collection so as to transmit measured sensor data to the gateway 200 through the data channel 300 (S300).

At step (D) (S400), the sensor unit 100 receiving the collection permission response at step (C) performs data communication with the gateway 200 and transmits the measured data through the data channel 300.

A separate data channel is used for communication of data between the gateway 200 and the sensor unit 100, which takes a long time, to smoothly and stably perform data communication, for example, in collecting sensor data from several sensor nodes 10 using one gateway 200.

In addition, at step (E) (S500), when transmission of the measured data is finished, the sensor unit 100 notifies that collection is finished to the gateway 200 (Noti: termination of collection), and the gateway 200 receiving termination of collection transmits a collection termination event to the server 500 and transmits the received sensor data.

Here, the server 500 receiving the measured sensor data may store and analyze the data in a database classified by sensor.

Here, steps (A) to (E) (S100 to S500) may be performed at set intervals, or the sensor unit 100 may enter a standby mode of standing by without measuring data after step (E) (S500), and when a new motion is detected, steps (A) to (E) (S100 to S500) may be performed again.

Figure 4:
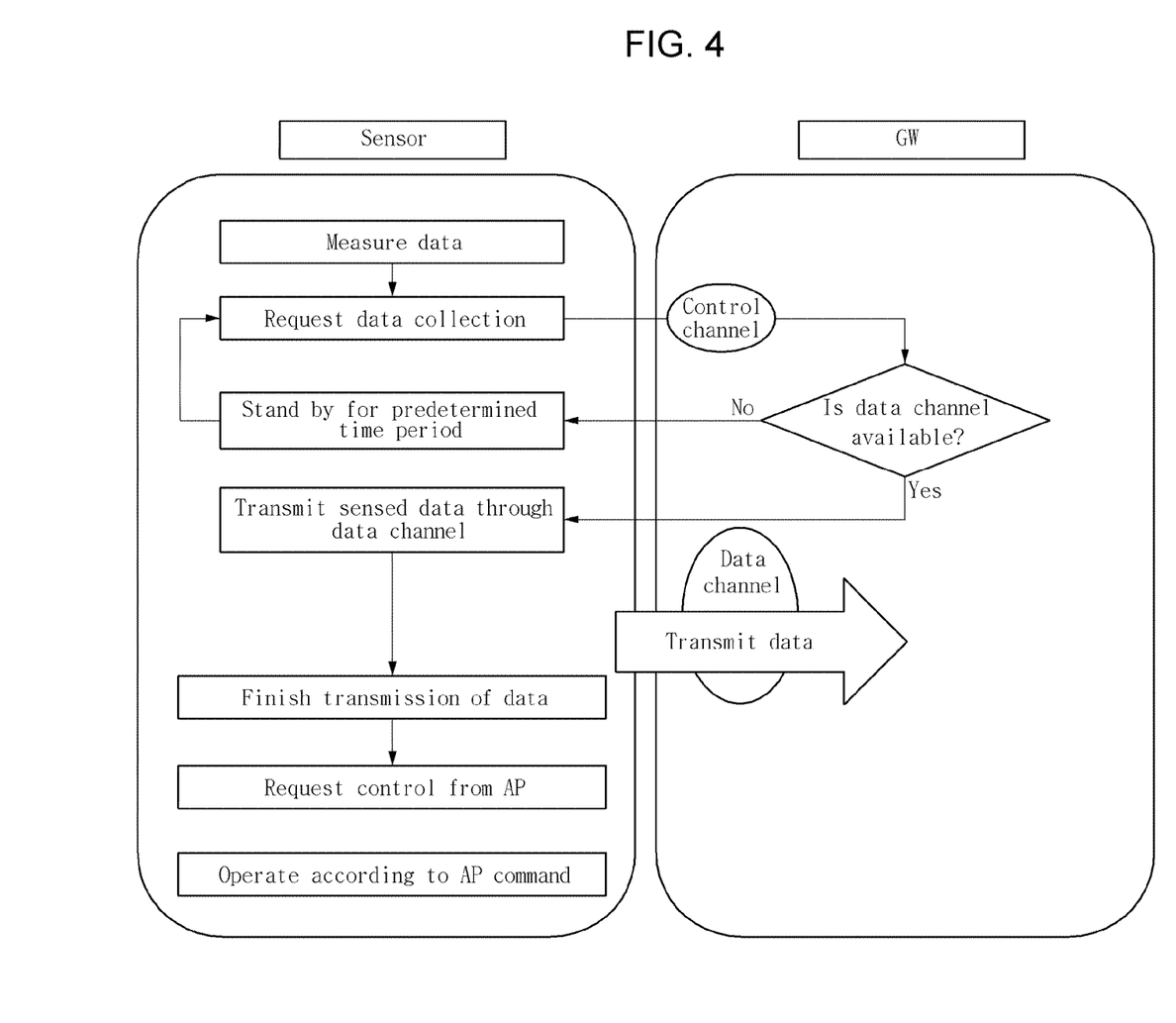
FIG. 4 is a flowchart illustrating a detailed protocol of a sensor data collection method according to an embodiment of the present invention.

FIG. 4 is a flowchart illustrating a detailed protocol of a sensor data collection method according to an embodiment of the present invention.

Referring to FIG. 4, the sensor on the left side is the sensor unit 100 of the sensor data collection system and method according to the embodiment of the present invention, and the GW on the right side is the gateway 200 of the sensor data collection system and method according to an embodiment of the present invention.

Here, the sensor unit 100 measures data (S100) and requests data collection from the gateway 200 through the control channel 400 (S200), and when the data channel is unavailable (S310), the gateway 200 informs the sensor unit 100 to wait for a predetermined time, and the sensor unit 100 requests data collection again, and when the data channel is available, and the gateway 200 permits the sensor unit 100 to collect data (S300), and the sensor unit 100 transmits sensed data to the gateway 200 through the data channel 300 (S400), and data transmission is finished (S500).

When data transmission is finished, the sensor unit 100 may request the AP to control, and operate according to an AP command.

Here, the AP is an access point of the server 500 of the system of the present invention.

Figure 5:
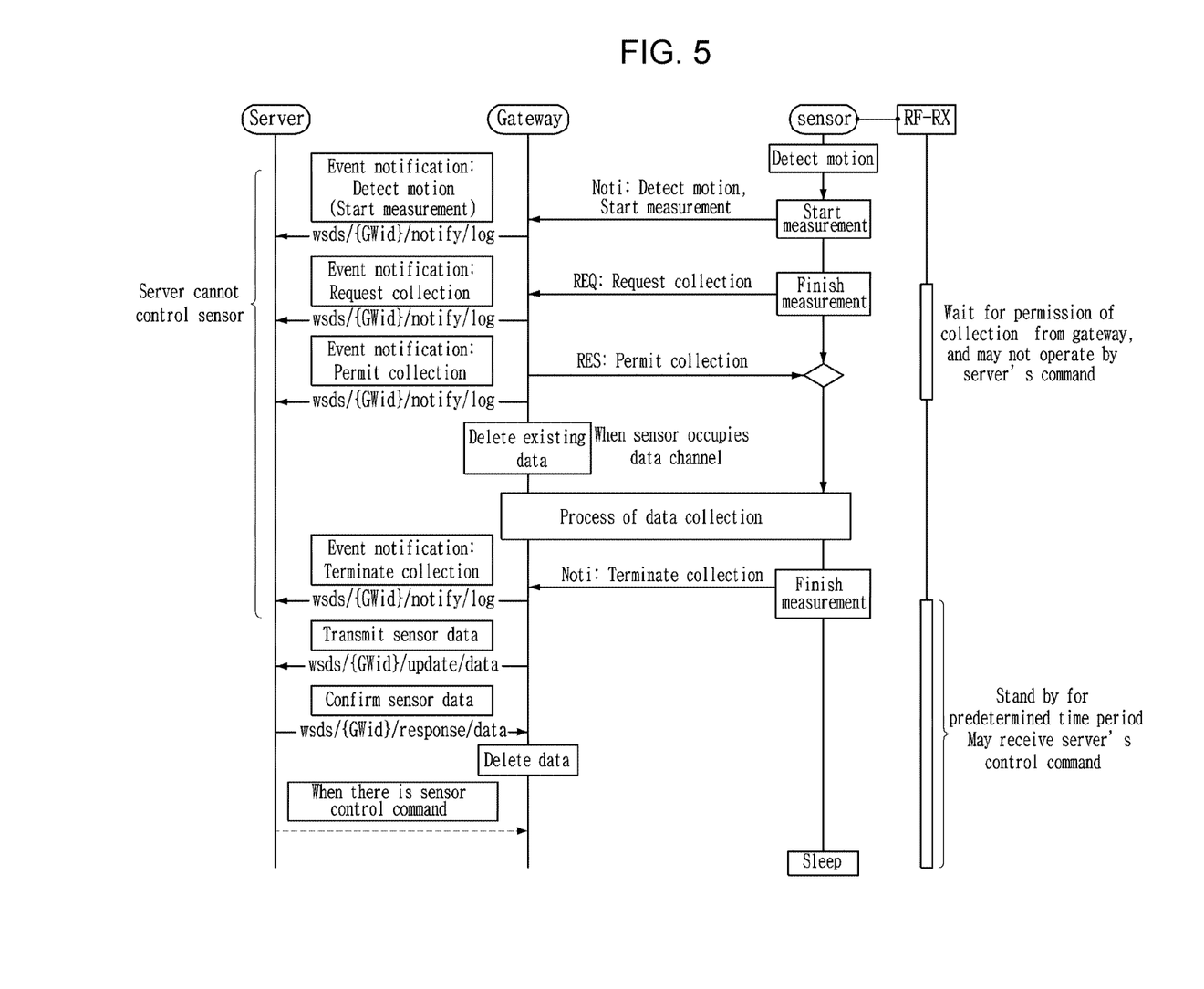
FIG. 5 is a flowchart illustrating a detailed protocol between a server and a gateway in a sensor data collection method according to an embodiment of the present invention.

FIG. 5 is a flowchart illustrating a detailed protocol between a server and a gateway in a sensor data collection method according to an embodiment of the present invention.

Referring to FIG. 5, the Server on the left side is the server 500 of the sensor data collection system and method according to an embodiment of the present invention, the Gateway in the middle is the gateway 200 of the sensor data collection system and method according to an embodiment of the present invention, and the sensor on the right side is the sensor unit 100 of the sensor data collection system and method according to an embodiment of the present invention, and the sensor unit 100 may communicate with the gateway 200 through a wireless receiver (RF-RX).

Here, when a motion is detected, the sensor unit 100 starts measuring data and notifies start of measurement to the gateway 200 (Noti: motion detection, start of measurement), and the gateway 200 receiving the measurement start notification transmits a measurement start event to the server 500 (S100).

Thereafter, when the measurement is finished, the sensor unit 100 requests data collection from the gateway 200 through the control channel 400 (REQ: request of collection), and the gateway 100 receiving the data collection request transmits a collection request event to the server 500 (S200).

When a data channel is available, the gateway 200 transmits a collection permission response (RES: permission of collection) to the sensor unit 100, and transmits a collection permission event to the server 500 (S300).

The sensor unit 100 receiving the collection permission response transmits the measured data to the gateway 200, and at this point, when any one of the one or more sensor nodes 10 of the sensor unit 100 occupies the data channel, the gateway 200 deletes the existing data and collects data from the sensor unit 100 (S400).

Thereafter, when transmission of the measured data is finished, the sensor unit 100 notifies that collection is finished to the gateway 200 (Noti: termination of collection), and the gateway 200 receiving the termination of collection transmits a collection termination event to the server 500 and transmits the received sensor data (S500).

Thereafter, the server 500 transmits a signal indicating that the sensor data transmitted by the gateway 200 has been confirmed to the gateway 200, and the gateway 200 receiving the signal indicating confirmation of the transmitted sensor data deletes the collected data.

Thereafter, the server 500 may transmit a sensor control command to the gateway 200.

Referring to FIG. 5, since the sensor unit may enter the standby mode after all the steps are finished, the last step is expressed as SLEEP.

Here, until the sensor unit 100 receives the collection permission response (S400) after requesting data collection from the gateway 200 through the control channel 400 (S300), the wireless receiver (RF-RX) of the sensor unit 100 waits for permission of collection from the gateway 200 and may not operate according to a command from the server 500.

Accordingly, the server 500 may not control the sensor unit 100 during steps (A) to (E) (S100 to S500), and after step (E) (S500) is finished, accurately, after data collection of the sensor unit 100 is finished, the wireless receiver (RF-RX) of the sensor unit 100 may receive a control command of the server 500 while waiting for a preset fixed period of time.

As described, there is provided a method of collecting data of several sensors using one gateway through the system and method for collecting sensor data using a control channel according to an embodiment of the present invention.

The control communication between the gateway and the sensor (which takes a short time) uses a separate control channel, and the data communication between the gateway and the sensor (which takes a long time) uses a separate data channel.

To guarantee stable data communication between the gateway and the sensor, the gateway performs data communication with one sensor at a time.

After confirming whether a data channel is available by the gateway through the control channel, the sensor may attempt data transmission when the data channel can be secured.

In this way, since data can be collected from multiple sensors using one gateway, a communication environment can be constructed to be suitable for the customer's environment, and when the moving range of the sensor is long, a sensor communication network can be constructed by building gateways at appropriate points.

According to the present invention, it is possible to enable stable and efficient data communication and construct an appropriate communication environment in accordance with a customer's environment by using separate channels for control communication and data communication between a gateway and a sensor when the gateway collects sensor data.

The effects of the present invention are not limited to those mentioned above, and unmentioned other effects will be clearly understood by those skilled in the art from the description.

What is claimed is:

1. A sensor data collection method comprising steps of:
(A) starting measurement and notifying start of measurement to a gateway by a sensor unit, and transmitting a measurement start event to a server by the gateway;
(B) requesting data collection from the gateway through a control channel by the sensor unit when the measurement is finished, and transmitting a collection request event to the server and determining whether a data channel is available by the gateway;
(C) transmitting a collection permission response to the sensor unit and transmitting a collection permission event to the server by the gateway when the data channel is available;
(D) performing data communication with the gateway to transmit measured data through the data channel by the sensor unit when the collection permission response is received; and
(E) notifying termination of collection to the gateway by the sensor unit when transmission of the measured data is finished, and transmitting a collection termination event to the server and transmitting the received sensor data by the gateway.

2. The method according to claim 1, wherein steps (A) to (E) are performed at set intervals.

3. The method according to claim 1, wherein the sensor unit enters a standby mode of standing by without measuring data after step (E), and performs steps (A) to (E) when a new motion is detected.

4. The method according to claim 1, wherein at step (C), the gateway transmits the collection permission response to the sensor unit and transmits the collection permission event to the server when the data channel is available, and the gateway requests the sensor unit to wait for a predetermined time when the data channel is unavailable, and performs step (B) after the predetermined time is elapsed.

5. The method according to claim 1, wherein the sensor unit includes a sensor node for measuring leakage magnetic flux of an object that needs to be measured.

6. A sensor data collection system comprising:
a sensor unit including one or more sensor nodes directly or indirectly connected to each other;
a gateway for collecting sensor data measured by the sensor unit; wherein the sensor unit requests the gateway to collect the sensor data when the measurement of the sensor data is finished;
one or more data channels for transmitting the sensor data measured by the sensor unit to a gateway; wherein the sensor unit requests the gateway to terminate collection of the sensor data when the transmission of the sensor data is finished;
a control channel through which the gateway confirms whether any one of the one or more data channels is available when the gateway has received the data collection request; and
a server for storing and analyzing the sensor data collected by the gateway in a database classified by the sensor unit,
wherein the sensor unit transmits the data collection request to the server, and transmits the collection termination request to the server.

7. The system according to claim 6, wherein the sensor unit enters a standby mode of standing by without measuring data until a new motion is detected when data collection of transmitting the sensor data measured by the sensor unit to the gateway is finished, and begins measurement again when a motion is detected.

8. The system according to claim 6, wherein the data channel transmits the sensor data measured by the sensor unit to the gateway when the sensor unit inquires the gateway whether the any one of the one or more data channels is available through the control channel and receives an answer indicating that the any one of the one or more data channels is available.

9. The system according to claim 6, wherein the one or more sensor nodes include a sensor for measuring leakage magnetic flux of an object that needs to be measured.

\* \* \* \* \*